United States Patent
Dubois et al.

(10) Patent No.: US 10,647,805 B2
(45) Date of Patent: May 12, 2020

(54) HIGHLY ASYMMETRIC TRIBLOCK POLYMER COMPOSITIONS AND METHODS OF MAKING SAME

(71) Applicant: Kraton Polymers LLC, Houston, TX (US)

(72) Inventors: Donn Dubois, Houston, TX (US); Martine Dupont, Mont St. Guibert (BE); Carl Willis, Houston, TX (US); Robert Q. Kluttz, Houston, TX (US)

(73) Assignee: Kraton Polymers LLC, Houston, TX (US)

(*) Notice: Subject to any disclaimer, the term of this patent is extended or adjusted under 35 U.S.C. 154(b) by 77 days.

(21) Appl. No.: 16/004,354

(22) Filed: Jun. 9, 2018

(65) Prior Publication Data

US 2018/0355090 A1 Dec. 13, 2018

Related U.S. Application Data

(60) Provisional application No. 62/517,849, filed on Jun. 9, 2017.

(51) Int. Cl.
| | | |
|---|---|---|
| C09J 123/20 | (2006.01) | |
| C08L 53/02 | (2006.01) | |
| C09J 153/02 | (2006.01) | |
| C08F 293/00 | (2006.01) | |
| C08L 95/00 | (2006.01) | |
| C08F 297/04 | (2006.01) | |

(52) U.S. Cl.
CPC ........ C08F 293/00 (2013.01); C08F 297/044 (2013.01); C08L 53/02 (2013.01); C08L 95/005 (2013.01); C09J 123/20 (2013.01); C09J 153/025 (2013.01); C08L 95/00 (2013.01); C08L 2555/22 (2013.01); C08L 2555/84 (2013.01)

(58) Field of Classification Search
CPC ....... C08L 53/02; C08L 53/025; C09J 153/02; C09J 153/025; C08F 297/044
See application file for complete search history.

(56) References Cited

U.S. PATENT DOCUMENTS

| | | |
|---|---|---|
| 4,891,410 A | 1/1990 | Bronstert et al. |
| 5,458,792 A | 10/1995 | Rhodes et al. |
| 7,125,940 B2 | 10/2006 | Willis |
| 7,622,519 B2 | 11/2009 | Kluttz et al. |
| 7,728,074 B2 | 6/2010 | Kluttz et al. |
| 2003/0149140 A1* | 8/2003 | Stephens ............... C08F 287/00 524/59 |
| 2006/0241218 A1 | 10/2006 | Kim et al. |
| 2008/0051510 A1 | 2/2008 | Toney et al. |
| 2008/0221546 A1* | 9/2008 | Quinn ................ C09J 123/0853 604/389 |
| 2012/0149826 A1 | 6/2012 | Kim et al. |
| 2015/0284606 A1 | 10/2015 | Stol et al. |
| 2016/0340552 A1* | 11/2016 | O'Connell .............. E01C 19/17 |

* cited by examiner

*Primary Examiner* — Jeffrey C Mullis
(74) *Attorney, Agent, or Firm* — Ramesh Krishnamurti

(57) ABSTRACT

A styrenic triblock copolymer composition with a combination of excellent tensile strength and high melt index, excellent for manufacturing, finishing and handling, forming stable pellets, for use in applications including but not limited to adhesive, coating, and flexographic printing. The composition comprises a first block which is a polymer of a monoalkenyl arene; a second block which is polymer of a conjugated diene and a third block which is a polymer of a monoalkenyl arene wherein a peak molecular weight of the third block is from about 0.06 to about 0.4 times that of the first block.

17 Claims, No Drawings

HIGHLY ASYMMETRIC TRIBLOCK POLYMER COMPOSITIONS AND METHODS OF MAKING SAME

RELATED APPLICATIONS

This application claims priority from U.S. Provisional Application No. 62/517,849, with a filing date of Jun. 9, 2017, the entire disclosures of which are incorporated herein by reference for all purposes.

TECHNICAL FIELD

The disclosure relates to the use of styrenic block copolymers for use in applications including adhesive, flexographic printing, and paving & roofing.

BACKGROUND

Pure styrenic diblock copolymers have significant commercial demand in the adhesives industry since they can impart desirable properties such as high tack, low hot melt viscosity and in the case of pressure sensitive adhesive label production, they allow more efficient converting. However, styrenic diblock copolymers cannot easily be made into convenient pellet form. Typically such products are supplied as a rubber bale. Further, in order to obtain these conventional styrenic diblock copolymers that are pelletized requires cost investment such that it is sold at a premium price and suffers from excessive cold flow.

There is an ongoing need to develop block copolymer compositions having desirable processing characteristics.

SUMMARY

In one aspect, a composition comprising a styrenic triblock copolymer along with methods of preparation is disclosed. The composition comprising a first block which is a polymer of a monoalkenyl arene; a second block which is polymer of a conjugated diene and a third block which is a polymer of a monoalkenyl arene, wherein the block copolymer has a peak molecular weight ranging from 10,000 to 500,000 g/mol; the third block has a peak molecular weight ranging from 0.06 to 0.4 of the peak molecular weight of the first block; and the composition has a total arene content ranging from 15 to 40 wt. %.

In another aspect, a method for preparing a highly asymmetric triblock ("HAT") copolymer composition is disclosed. The method comprises: polymerizing a sufficient amount of a first monoalkyl arene to form a first polymer block (A1), adding a conjugated diene and polymerizing the conjugated diene to form a second polymer block (B) appended to the first polymer block, and adding a sufficient amount of a second monoalkyl arene and polymerizing to form a third polymer block appended to the second polymer block, forming the HAT copolymer; wherein a ratio of the peak molecular weight of the third block to the peak molecular weight of the first block ranges from 0.06 to 0.4.

In yet another aspect, a method for preparing a highly asymmetric triblock ("HAT") copolymer composition via a coupling polymerization process is disclosed. The method comprises polymerizing a sufficient amount of a first monoalkyl arene to form a first polymer block (A2), adding a conjugated diene and polymerizing the conjugated diene to form a second polymer block (B) appended to the first polymer block, adding a sufficient amount of a second monoalkyl arene and polymerizing to form a third polymer block (A1) appended to the second polymer block, and adding a coupling agent X to form the HAT copolymer having a formula (A2BA1)nX, and wherein a ratio of the peak molecular weight of the first block (A2) to the peak molecular weight of the third block (A1) ranges from 0.06 to 0.4.

DETAILED DESCRIPTION

The following terms will be used throughout the specification and will have the following meanings unless otherwise indicated.

"Molecular weight" refers to the true molecular weight in g/mol of the polymer or block of the copolymer, which can be measured with gel permeation chromatography (GPC) using polystyrene calibration standards according to ASTM 5296-11. It will be appreciated by those skilled in the art that GPC analysis reports column retention times that are then converted to standardized molecular weights, usually using polystyrene standards. These "styrene equivalent" molecular weights are commonly used in the polymer industry. For the purposes of this disclosure, peak molecular weights are reported as true molecular weights based on molar mass rather than GPC "styrene equivalent" retention times.

Peel adhesion tests (FTM 1, Peel adhesion (180°) at 300 mm per minute) and loop tack tests (FTM 9, Loop' tack measurement) are as described in the Finat Technical Handbook, Test Methods, 9th edition, FINAT, the Netherlands, May 2014, using an RK K Control Coater (RK PrintCoat Instruments Ltd).

Tensile strength is determined in accordance with ASTM D412.

Melt index refers to the melt flow of the polymer according to ASTM D 1238, under condition G at 200° C. at 5 kg load. It is expressed in units of grams of polymer melt passing through an orifice in 10 minutes.

"Diblock copolymer" refers to the proportion of free diblock present in the composition.

"Coupling efficiency" refers to the number of molecules of coupled polymer divided by the number of molecules of coupled polymer plus the number of molecules of uncoupled polymer. For example, if a coupling efficiency is 80%, then the polymer will contain 20% diblock and 80% triblock and multiarm block.

"HAT" refers to highly asymmetric triblock copolymer, with the term "highly asymmetric" refers to a difference between the polystyrene blocks of the HAT polymers. In some embodiments, HAT is blended with a second polymer, or other ingredients, to form a blended HAT. The second polymer may comprise a styrenic block or combinations thereof. A reference to HAT includes HAT blends.

"Hydrogenated HAT polymer" refers to a HAT polymer that has been brought in contact with a hydrogenation catalyst for a period of time and under suitable conditions to generally improve thermal stability, ultraviolet light stability, oxidative stability, and, therefore, weatherability of the final polymer.

"Vinyl content" refers to the polymer product that is made when 1,3-butadiene is polymerized via a 1,2-addition mechanism, resulting in a monosubstituted olefin, or vinyl group, adjacent to the polymer backbone. The effects of 3,4-addition polymerization of isoprene on the final properties of any block copolymer will be similar to those from 1,2-addition of butadiene.

Disclosed herein are HAT polymers and compositions comprising HATs along with the methods of preparation thereof. The HAT polymers are characterized as having physical properties typically associated with diblock copolymers (e.g., lower cohesive strength, low melt viscosity and improved tack) at a temperature range greater than 150° C., and handling characteristics that are similar to triblock copolymer such as being able to form pellets in another temperature range, e.g., less than 110° C. The HAT polymers can be used as components of adhesives, pressure sensitive adhesives, flexographic, paving & roofing applications.

HAT Polymer Composition—Triblock A1-B-A2

In one embodiment, the HAT composition is a triblock polymer designated A1-B-A2 wherein both A1 and A2 are monoalkenyl arene blocks, and B is a conjugated diene block and the smaller A2 block at the terminus. A1 will refer to the larger of the two monoalkenyl arene blocks that differ substantially in molecular weight (MW). The peak MW of the A1 block is substantially greater than the peak MW of the A2 block such that the asymmetry can be expressed as A2=A1*X, where X ranges from about 0.06 to 0.40. In one embodiment, the peak MW of the A1 block is at least greater than 20%, greater than 30%, or greater than 40% the peak MW of the A2 block. In some embodiments, the composition comprises the formula (A2-B-A1)$_n$X wherein n is an integer from 2 to 6, X is the residue of a coupling agent. Linear coupled HATs are formed when n is equal to 2. Dendritic or star-shaped coupled HATs are formed where n is equal to or greater than 2. In aspects where the coupled HAT polymer is bound to the coupling agent at the A1 block, the coupled HAT comprises the formula (A2-B-A1)$_n$X.

In one embodiment, the A1 block is formed from a monoalkenyl arene monomer that differs from the monoalkenyl arene monomer that comprises the A2 block, e.g., in one example where the A1 block comprises substantially pure styrene and the A2 block comprises substantially pure p-methylstyrene. A HAT polymer comprising an A1 block and an A2 block composed of dissimilar monoalkyl arenes may be termed herein a distinct-edge HAT polymer.

In embodiments, the HAT polymer can comprise, consist of, or consist essentially of a HAT, a distinct-edge HAT, a coupled HAT, a hydrogenated HAT, or a combination thereof. The term "HAT polymer" will encompass any of the HAT polymers described herein.

In the above formulae, the monoalkenyl arene block comprises any polymerized monoalkenyl arene monomer. Examples include styrene, o-methylstyrene, p-methyl styrene, p-tert-butyl styrene, 2,4-dimethylstyrene, alpha-methylstyrene, vinylnaphthalene, vinyltoluene and vinylxylene or mixtures thereof. In further aspects, the monoalkenyl arene block comprises a substantially pure monoalkenyl arene monomer. In some embodiments, the monoalkenyl arene block comprises styrene wherein styrene may be used as a substantially pure monomer. For example, styrene may be the major component in mixtures with minor proportions of structurally related vinyl aromatic monomers. Structurally related vinyl aromatic monomers which may be used as the minor component in mixtures having a major component comprising styrene may be o-methylstyrene, p-methylstyrene, p-tert-butylstyrene, 2,4-dimethylstyrene, α-methylstyrene, vinyl naphthalene, vinyltoluene, vinylxylene or combinations thereof. In some aspects, the proportion of the vinyl aromatic monomers comprising the minor component of a mixture comprising styrene may not exceed about 10% wt.

In embodiments, the monoalkenyl arene content of the A1 block ranges from 5% wt. to 50% wt., alternatively 5-40% wt., or alternatively 10-35 wt. % based on the total weight of the HAT polymer. In embodiments, the monoalkenyl arene content of the A2 block of a HAT polymer ranges from 1-20% wt., alternatively 15% wt or alternatively 1-10 wt. % based on the total weight of the HAT polymer.

In some aspects, the peak molecular weight of each A1 block is from 5000 to 50,000 g/mol, alternatively from 10,000 to 40,000 g/mol or alternatively from 10,000 to 30,000 g/mol. In an aspect, the peak molecular weight of each A2 block is from 1000 to 10,000 g/mol, alternatively from 1000 to 8000 g/mol or alternatively from 1000 to 5000 g/mol.

In embodiments, the molecular weight of the A1 and A2 blocks relative to each other may be expressed as the molecular weight of A2 ranges from (0.06)A1 to (0.4)A1 where A1 and A2 are expressed as molecular weight, regardless of unit.

In an aspect, the conjugated diene block may comprise any suitable conjugated diene; alternatively the conjugated diene has from four to ten carbon atoms. In an aspect, the conjugated diene is formed from a butadiene monomer or an isoprene monomer that is a substantially pure monomer or contains minor proportions, up to 10% by weight, of structurally related conjugated dienes, such as 2,3-dimethyl-1,3-butadiene, 1,3-pentadiene and 1,3-hexadiene and 7-methyl-3-methylene-1,6-octadiene (also referred to as myrcene). Alternatively, substantially pure butadiene or substantially pure isoprene is utilized for the preparation of the conjugated diene blocks, or alternatively substantially pure butadiene.

In some aspects, the peak molecular weight of each conjugated diene block is from 10,000 g/mol to 500,000 g/mol, alternatively from 10,000 g/mol to 200,000 g/mol or alternatively from 10,000 g/mol to about 150,000 g/mol.

In aspects when butadiene is the conjugated diene monomer, the vinyl content of the conjugated diene block (i.e., the B block) ranges from 8 mol % to 95 mol %, alternatively from 10 mol % to 85 mol % or alternatively from 12 mol % to 65 mol %. In aspects when isoprene is the conjugated diene monomer, the vinyl content of the B block ranges from 8 mol % to 95 mol %, alternatively from 10 mol % to 85 mol % or alternatively from 12 mol % to 65 mol %.

In an aspect, a low vinyl B block is a conjugated diene block comprising a vinyl content of less than 15 mol % based upon the composition of the entire conjugated diene block. In another aspect, a high vinyl B block is a conjugated diene block comprising a vinyl content of greater than 25 mol % based upon the composition of the entire conjugated diene block.

In some embodiments, the conjugated diene block (i.e., the B block) of the HAT polymers comprises a tapered vinyl content. "Tapered" refers to the distribution of the vinyl content such that the end of the B block adjacent to the monoalkenyl arene block has less than about 15 mol % vinyl content and the opposite end of the block (distal from the monoalkenyl arene block) has greater than about 25 mol % vinyl content.

In one embodiment, the vinyl content of the B block progressively increases across the expanse of the B block. In a further aspect, the B block comprises regions of low vinyl content near the A1 block and these regions of low vinyl content are followed by regions of high vinyl content distal from the either the A1 or A2 block depending on which of the two blocks is polymerized first. In some embodiments, the vinyl content of the B block would start at an amount less than 15 mol % and would on average progressively increase throughout the block. In a further aspect, the vinyl content at the first end of the B block ranges from 7-15 mol %, and on average increase throughout the B block such that at least the last 10-49% of the B block, or alternatively at least the last 25-49% of the B block comprises a vinyl content greater than 25 mol %, alternatively 25-80 mol %, alternatively 40-75 mol %, or alternatively 50-65 mol %.

In some embodiments, the conjugated diene block (i.e., the B block) of the HAT polymers comprises a highly-saturated B block wherein addition of hydrogen molecules has occurred across the C═C moieties within the B block. A highly-saturated B block comprises a B block wherein addition of hydrogen molecules has occurred across greater than 92 mol %, alternatively greater than 95 mol % or 98 mol % than of the C═C moieties within the B block.

In some embodiments, the conjugated diene block (i.e., the B block) of the HAT polymers comprises a partially saturated B block wherein addition of hydrogen molecules has occurred across only a portion of the C═C moieties within the B block. A partially saturated B block comprises a B block wherein addition of hydrogen molecules has occurred in the range of 20-90 mol %, alternatively 20-80 or 20-50 mol % of the C═C moieties within the B block.

In another aspect, the mixed B block comprises a mixture of butadiene and isoprene, alternatively a mixture of substantially pure butadiene and substantially pure isoprene. In yet a further aspect, the mole ratio of butadiene to isoprene comprising the mixed B block is any of 9:1, 4:1, 3:1, 2:1, 1:1, 1:2, 1:3, 1:4 or alternatively 1:9. In another aspect, the amount of butadiene in a mixed B block comprising butadiene and isoprene is any of at least 20% wt., at least 40% wt., at least 60% wt., or at least 80% wt. based upon the total weight of the entire mixed B block.

In an aspect, the B block of the HAT polymer can comprise, consist of, or consist essentially of a B block of low vinyl content, high vinyl content, tapered vinyl content. In another aspect, the B block may be highly saturated, partially saturated, unsaturated, or a combination thereof and wherein the B block may be a mixed B block. In one embodiment, the HAT polymer comprises a mixed midblock having amounts of two dienes in ratios of 10:90 to 90:10, e.g., mixtures of isoprene and butadiene, mixtures of butadiene and myrcene. The HAT polymers may comprise, consist of, or consist essentially of any of the chemical and physical properties (e.g., melt viscosity, tensile strength, etc.) present in the individual components (e.g., a coupled HAT, a high vinyl content B block, etc.).

In one embodiment, the HAT polymers (A1-B-A2) have a peak MW from 10,000 to 500,000 g/mol, alternatively from 10,000 to 300,000 g/mol or alternatively from 10,000 to 100,000 g/mol.

Optional Components:

The HAT compositions can further comprise one or more additional components, such as a tackifier, a wax, a stabilizer (e.g., an antioxidant UV stabilizer), a plasticizer (e.g., benzoates, phthalates), paraffin oil, naphthenic oil, a nucleating agent, an optical brightener, a pigment, a dye, glitter, a biocide, a flame retardant, an anti-static agent, an anti-slip agent, an anti-blocking agent, a lubricants, a filler, or a combination thereof.

In some embodiments, the HAT compositions can further contain stabilizers; non-limiting examples of which include primary antioxidants and secondary antioxidants. Chemical structure typically distinguishes primary antioxidants from secondary antioxidants. Hindered phenols and arylamines are examples of common primary antioxidants which scavenge alkoxy radicals and peroxy radicals. The primary antioxidants can be included in amounts of 0.3-1.5% wt. or alternatively 0.5-1% wt. based on the total weight of the HAT composition.

Secondary antioxidants may also be used along with the primary antioxidants. Phosphites and thiosynergists are common secondary antioxidants which scavenge hydroperoxides generated during the autoxidation cycle of a polymer exposed to heat and oxygen. Secondary antioxidants can be included in amounts of 0.5-2.5% wt. or alternatively 0.5-2% wt.

Method of Preparation:

The HAT polymers can be synthesized as A1-B-A2 or as A2-B-A1. In some embodiments, the polymers are prepared via sequential polymerization wherein: i) a monoalkyl arene block is polymerized; ii) a conjugated diene monomer is added to the reaction mixture, appended to the monoakyl arene block and subsequently polymerized; and iii) a monoalkyl arene monomer is added to the reaction mixture, appended to the conjugated diene block and subsequently polymerized. For the sequential HAT polymerization process, the A1 block or A2 block can be the first step. For the coupled process, the A2 block is prepared first followed by B, A1 and the final coupling reaction. In embodiments, HATs can be prepared by anionic living polymerization, as illustrated in U.S. Pat. Nos. 7,728,074 and 7,622,519 incorporated herein by reference.

The HAT polymers can be prepared by contacting monomer with an organoalkali metal compound in a suitable solvent at −150° C. to 300° C., alternatively from 0° C. to 100° C. Particularly effective polymerization initiators are organolithium compounds having the general formula RLi wherein R is an aliphatic, cycloaliphatic, alkyl-substituted cycloaliphatic, aromatic or alkyl-substituted aromatic radical having from 1 to 20 carbon atoms. Suitable solvents include aliphatic, cycloaliphatic, alkyl-substituted cycloaliphatic, aromatic and alkyl-substituted aromatic hydrocarbons, ethers and mixtures. Examples of aliphatic hydrocarbons include butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and alkyl-substituted hydrocarbons such as toluene and xylene, and ethers such as tetrahydrofuran, diethylether and di-n-butyl ether.

In embodiments, a vinyl modifier may be added to control the vinyl content of the conjugated diene block. In an example of a high vinyl conjugated diene block prepared in the presence of a vinyl modifier, the vinyl modifier can be added all at once, concurrently or nearly concurrently, with the conjugated diene monomer. Conjugated diene blocks comprising a high vinyl content and their corresponding coupled counterparts can be prepared as disclosed in U.S. Pat. No. 7,125,940, incorporated herein by reference. A conjugated diene block with tapered vinyl content can be prepared by adding the conjugated diene monomer to the reaction mixture followed by gradual addition of the vinyl modifier in a controlled manner. Vinyl modifiers that can be used include polar compounds such as ethers, amines and other Lewis bases such as dialkylethers of glycols. Examples include a dialkyl ether of ethylene glycol containing the same or different terminal alkoxy groups and optionally bearing an alkyl substituent on the ethylene radical; (e.g., monoglyme, diglyme, diethoxyethane, 1,2-diethoxypropane, 1-ethoxy-2,2-tert-butoxyethane, or 1,2-diethoxypropane). The chemical structure and properties of the vinyl modifier will determine the amount of vinyl modifier required to achieve the desired vinyl content. In general, the modifier will be added in an amount from 50 to 100,000 parts per million basis solvent.

In some embodiments, the HAT polymers optionally undergo catalytic hydrogenation to obtain a HAT polymer having the desired chemical and physical properties required by particular applications. Methods include standard methods for hydrogenating styrene butadiene block copolymers. Hydrogenation includes using a hydrogenation catalyst, such as a heterogeneous hydrogenation catalyst (e.g., a palladium catalyst, such as Pd supported on carbon (Pd/C), a platinum catalyst, such as PtO2, a nickel catalyst, such as Raney Nickel (Ra—Ni), a rhodium catalyst, or a ruthenium catalyst). Homogenous or colloidal hydrogenation catalysts can also be uses such as aluminum alkyl reduced Nickel Octoate or analogous metal complexes. In some cases, the hydrogenation catalyst is present in an amount ranging from 0.25% wt. to 5% wt., based on the total weight of the HAT. The hydrogen source for the hydrogenation can be hydrogen (H2) or a compound which may generate hydrogen under reaction conditions, such as formic acid, isopropanol, cyclohexene, cyclohexadiene, a diimide, or hydrazine.

The hydrogenation reaction can be performed at an elevated temperature, an elevated pressure, or combinations thereof. For example, the hydrogenation reaction can be at 120° C. to 300° C. and a pressure of 30 to 2000 pounds per square inch (psi), or 100 to 1000 psi.

In some embodiments, coupled HATs can be prepared by utilizing coupling agents selected from a range of chemical compounds including dihaloalkanes, silicon halides, siloxanes, multifunctional epoxides, silica compounds, esters of monohydric alcohols with carboxylic acids, (e.g. methylbenzoate and dimethyl adipate) and epoxidized oils. Non-limiting examples of coupling agents include tetra-alkoxysilanes such as tetra-methoxysilane (TMOS) and tetra-ethoxysilane (TEOS); tri-alkoxysilanes such as methyltrimethoxysilane (MTMS); aliphatic diesters such as dimethyl adipate and diethyl adipate; and diglycidyl aromatic epoxy compounds such as diglycidyl ethers deriving from the reaction of bis-phenol A, epichlorohydrin and combinations thereof. The amount of coupling agent to be added depends on the desired coupling efficiency and in the case of a multifunctional coupling agent, the number of arms bonded to the coupling agent. This is a stoichiometric reaction determined by the ratio of polymer chain-ends to coupling agent. The coupling agent can be contacted with the HAT at any point during preparation of the HAT. In another aspect, contacting of a coupling agent with the HAT may occur when the polymerization reaction has substantially consumed the monomers.

Properties:

In an aspect, the HAT polymer is characterized as having a tensile strength of from 0.1 MPa to 10 MPa, alternatively from 0.1 MPa to 5 MPa, or alternatively from 0.1 MPa to 4 MPa as determined in accordance with ASTM D412.

In an aspect, the HAT block copolymers is characterized by a flow rate or melt index greater than 5 g/10 min. as determined in accordance with ASTM D1238 measured at 200° C. with a 5 kg load. Alternatively, the melt index of the HAT composition may range from 5 g/10 min to 200 g/10 min., alternatively from 5 g/10 min. to 50 g/10 min.

Applications:

Throughout this disclosure, reference to the properties of the HAT composition refers to characteristics held by each block copolymer present in the composition (unless specifically stated otherwise).

The HAT compositions can be used in a variety of applications, including coating, adhesives, hot-melt adhesives, pressure sensitive adhesives (PSAs) and flexographic printing applications. When employed as PSAs for labelling formulations, the HAT compositions provide improved convertibility over conventional formulations.

During PSA label manufacture, a laminate of face stock, pressure sensitive layer and a release liner is passed through an apparatus which converts the laminate to yield commercially useful labels. The processes involved in the converting operation include printing, die-cutting and matrix stripping to leave labels on a release liner. The cost of converting a laminate into a finished product is a function of the speed at which the various processing operations occur. While the nature of all layers of the laminate can impact cost of convertibility, the adhesive layer can be a limiting factor in ease and cost of convertibility, due to its viscoelastic nature and tensile strength which hamper precise and clean penetration of a die in die-cutting operations and promotes adherence to cutting blades. Stringiness of the adhesive also impacts matrix stripping operations which follow die-cutting operations. The diblock-like performance of the HAT in label adhesive formulation affords lower cohesive strength for better convertibility.

Achieving good convertibility does not, by necessity, coincide with achieving excellent adhesive performance. Good general purpose adhesives can exhibit poor convertibility because the adhesive is difficult to cleanly cut. Such an adhesive can stick to a die or blade. In label manufacture, die-cutting and matrix stripping operations occur in a variety of speeds in the range of 0 to 300 meters per minute. Within the range, an adhesive can provide regions where a matrix will break despite the fact that successful matrix stripping can occur at speeds on either side of the region. The HAT compositions can provide adhesive systems, wherein the adhesive can be cleanly cut and the matrix stripped over the entire range of operating speeds, thereby improving convertibility over conventional PSAs labelling formulations.

In some embodiments, the HAT composition is used in a PSA label formulation. The compositions, due to their higher melt flow rates is characterized by fast mixing of hot melt adhesive formulations. The PSA label formulation can comprise the HAT composition (e.g., from 30% wt. to 60% wt.), a tackifying resin (e.g., from 30% wt. to 60% wt. such as Wingtack 86), a plasticizing oil (e.g., from 0% wt. to 45% wt. such as Sontex 450 oil), and optionally a stabilizer (e.g., from 0% wt. to 3 wt. % such as Irganox 1010) and, optionally, additional polymers and/or binders. The tackifying resin is selected from the group consisting of C5 hydrocarbon resins, C5/C9 hydrocarbon resins, hydrogenated and partially hydrogenated C9 hydrocarbon resins, rosin esters, terpenes and styrenated terpene resins.

It will be appreciated to those skilled in the art that the properties of HAT polymers will find utility in other applications requiring good finishability and pelletizability while also requiring easy blending. For example, HAT polymers can be used in asphalt modification where good high temperature properties are required for, paving, roofing, waterproofing, sound deadening or carpet backing applications while ease of blending is desirable for low shear asphalt blending. Paving applications include hot asphalt applications such as asphalt concrete paving and hot in-place recycling and emulsion applications such as fog seals, chip seals, scrub seals, cape seals, micro surfacing, cold in-place recycling and cold central plant recycling. Roofing applications include modified bitumen low slope membranes, self-adhering underlayments and modified asphalt shingles.

Diblock copolymers cannot easily be made into convenient pellet form because they are prone to coldflow, hence are offered as baled rubber. Even after dusting the materials may cold flow rapidly and create end-use processing difficulties. For example, DYNASOL SOLPRENE 1205 is a very high volume diblock copolymer that is usually supplied as a rubber bale. To be pelletized, it is sold at a premium price and suffers from excessive cold flow. On the other hand, the HAT compositions disclosed herein can be finished as a stable pellet which provides easier handling than a baled rubber form of most pure diblocks in the prior art.

EXAMPLES

The examples are given by way of illustration and are not intended to limit the specification or the claims to follow in any manner.

Example 1

The different experimental SIS (styrene isoprene styrene), SBS (styrene butadiene styrene), SIBS (styrene isoprene butadiene styrene) polymer structures can be found in Table 1. Samples A, B and C are sequential asymmetric triblock polymers with no detectable diblocks. They differed mainly by the size of the PS endblocks.

TABLE 1

Molecular parameters for HAT SIS, SBS and SIBS polymers

| HAT Polymer Sample | Structure | Rubber phase | A1 (kg/mol) | A2 (kg/mol) | Total MW (kg/mol) | Polystyrene content % |
|---|---|---|---|---|---|---|
| A* | A1-B-A2 | polyisoprene | 16 | 7.5 | 188 | 18.4 |
| B* | A1-B-A2 | polyisoprene | 21 | 3.5 | 200 | 18.5 |
| C* | A1-B-A2 | polyisoprene | 16 | 4 | 154 | 18 |
| D** | A1-B-A2 | polybutadiene | 16 | 3 | 59 | 32 |
| E*** | A1-B-A2 | mixed diene | 13 | 2.9 | 90 | 18 |
| F*** | A1-B-A2 | mixed diene | 14.5 | 3 | 100 | 18 |

*SIS
**SBS
***SIBS

The physical properties of these HAT SIS polymers are reported in Table 2. The PS endblocks of Sample A (16/7.5) are not sufficiently different to significantly reduce the tensile strength (TS). The different endblock size has decreased the TS but not sufficiently to counteract the absence of diblocks and the higher polystyrene content compared to a commercially available SIS product, e.g., a coupled SIS based on styrene and isoprene with 55% diblock and a polystyrene content of 16%, having a melt flow of 24 g/10 min (@load of 5 kg. and temperature of 200° C.), a tensile strength of 4.14 MPa, elongation at break of 1500%, 300% Modulus of 0.345 MPa.

TABLE 2

| HAT Polymer Sample | Modulus 300% | Modulus 500% | Modulus 700% | Tensile Strength MPa | Elongation to Break % | Hardness Shore A | MFR g/10 min | sol. visc. (mPa-s) |
|---|---|---|---|---|---|---|---|---|
| A | 1.22 | 1.88 | 3.1 | 29 | 1100 | 40 | 8 | 990 |
| B | 0.68 | 0.91 | 1.3 | 8 | 1180 | 31 | 12 | 1310 |
| C | 0.89 | 1.2 | 1.8 | 10 | 1160 | 31 | 19 | 550 |
| D | 0.80 | * | * | 1.5 | — | 52 | 21 | 1011 |
| E | 0.34 | * | * | <1 | 388 | 24 | 31 | 748 |
| F | 0.43 | * | * | <1 | 384 | 24 | 17 | 987 |
| Comparative | 0.345 | — | — | 4.14 | 1500 | 23 | 24 | — |

* not measurable

Example 2

The SIS HAT polymers were formulated into adhesives, whose properties are shown in Table 3. The adhesives can be prepared with a mixer at about 180° C. for a total mixing time about 35 minutes. The mandrel and convertibility were assessed on a commercial label line. For Samples A-C, the adhesives formulation used was 39.7% HAT SIS polymer, 49.8% Eastman Piccotac 95E resin, 10% naphthenic oil and 0.5% Irganox 1010 antioxidant. For Samples E and F, the adhesive formulations used was 40 wt. % SIBS HAT polymer, 50 wt. % Cray Valley Wingtack 86 resin, 9.5 wt. % naphthenic oil and 0.5% Irganox 1010 antioxidant. The formulations were mixed as a hot melt adhesive. The adhesive blends were dissolved in toluene at 40% solids and cast to 1 mil Mylar film using a 0.004" size doctor blade. The films were dried for 1 hour and then for 4 hours at 40° C. under vacuum prior to testing.

The samples were compared with an adhesive made with the commercially available SIS polymer blended with a pure diblock such as Solprene 1205. The full sequential HAT SIS polymers behaved similarly to a high diblock SIS polymer. Adhesive made with Sample C shows lowest cohesive strength (due to higher asymmetry).

TABLE 3

| Sample | Loop Tack, SS (N/25 mm) | Peel Adhesion, SS (N/25 mm) | SAFT ° C. | Holding Power 2 kg (hours) | HP 5 kg (hours) | Hot Melt Viscosity 180° C. Pa · s |
|---|---|---|---|---|---|---|
| A | 21 | 18 | 105 | >160 | 18 | 84 |
| B | 21 | 18 | 87 | 58 | 4 | 582 |
| C | 12 | 16 | 83 | 42 | 2 | 68 |
| D | 22 | 23 | 86 | >160 | — | 155 |
| E | 39 | 12 | 65 | 349/cohesive | — | 16 |
| F | 22 | 14 | 65 | 375/cohesive | — | 22 |

Example 3—Comparative Adhesives

Additional comparable adhesives were formulated according to Table 4 with F1 employing Sample D. F2 contains a commercially available high diblock SBS copolymer with a polystyrene content of 33%, 78% diblock content, tensile strength of 2 MPa (ISO37), and elongation at break of 600% (ISO37). F3 employing Solprene 1205 as the polymer. Comparing the results obtained with the comparative examples and adhesives with the HAT compositions, the results in Table 5 show that the HAT composition gave excellent loop tack and peel properties, indicating that the composition can be useful as the sole polymer for label adhesives or alternatively could be blended in place of a pure diblock such as SOLPRENE 1205.

TABLE 4

| F1 | (wt %) | F2 | (wt %) | F3 | (wt %) |
|---|---|---|---|---|---|
| Sample D | 40 | Commercial hi diblock | 40 | Solprene 1205 | 40 |
| Wingtack 86 | 50 | Wingtack 86 | 50 | Wingtack 86 | 50 |
| Sontex 450 oil | 9.5 | Sontex 450 oil | 9.5 | Sontex 450 oil | 9.5 |
| Irganox 1010 | 0.5 | Irganox 1010 | 0.5 | Irganox 1010 | 0.5 |
| Mixing time (min) | 50 | Mixing time (min) | 60 | Mixing time (min) | 48 |
| Mixing T range (° C.) | 162-178 | Mixing T range (° C.) | 166-179 | Mixing T range (° C.) | 160-180 |

TABLE 5

| | F1 | F2 | F3 |
|---|---|---|---|
| Film thickness mil | 1.8-2 | 2 | 2-2.2 |
| Rolling ball tack cm | 2.3 | 1.4 | 1.1 |
| Loop Tack N/25 mm | 56.2 | 48.2 | 22.4 |
| Loop Tack failure mode | Cohesive | slightly cohesive | cohesive |
| 180 Peel to SS N/25 mmi | 23.1 | 15.5 | 5.95 |
| 180 Peel Failure Mode | Cohesive | adhesive* | cohesive |
| HP to SS, 2 kg (1" × 1") min | 1 failed @8841.9 min, 2 not fail | did not fail, test stopped at 10000 min | 48.5 |
| HP Failure Mode | Cohesive | n/a | cohesive |
| SAFT Mylar- 0.5 kg C | 86.07 | 105.76 | 65.12 |
| HMV at 177° C. * cP | 15513 | 32697 | 21460 |

* HMV measured using a Brookfield viscometer fitted with spindle #27.
*adhesive remained on steel, not mylar The terms "a," "an," and "the" are intended, unless specifically indicated otherwise, to include plural alternatives, e.g., at least one. Herein, while compositions and processes are described in terms of "comprising" various components or steps, the compositions and methods can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an embodiment whether or not the statement is explicitly recited.

While various aspects have been shown and described, modifications thereof can be made by one skilled in the art without departing from the spirit and teachings of the disclosure. The aspects described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from 1 to 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

All publications, patent applications, and patents mentioned herein are incorporated by reference in their entirety. In the event of conflict, the present specification, including definitions, is intended to control. With respect to all ranges disclosed herein, such ranges are intended to include any combination of the mentioned upper and lower limits even if the particular combination is not specifically listed.

The invention claimed is:

1. An adhesive composition comprising:
   from 30 to 60 wt. % of a highly asymmetric triblock ("HAT") copolymer,
   from 30% wt. to 60% wt. of a tackifying resin,
   from 0 to 45 wt. % of an oil,
   and from 0.1 to 3 wt. % of an anti-oxidant, wherein the wt. % is based on the total weight of the adhesive composition;
   wherein the HAT copolymer comprises a first block which is a polymer of a monoalkenyl arene, a second block which is a polymer consisting of a conjugated diene, and a third block which is a polymer of a monoalkenyl arene, wherein:
      the block copolymer has a peak molecular weight ranging from 10,000 to 500,000 g/mol,
      the third block has a peak molecular weight ranging from 0.06 to 0.4 of the peak molecular weight of the first block; and
      wherein the HAT copolymer has a total arene content ranging from 15 to 40 wt. %.

2. The adhesive composition of claim 1, wherein the HAT polymer comprises mixtures of copolymers having formula A1-B-A2 or $(A2-B-A1)_nX$,
   wherein both A1 and A2 are monoalkenyl arene blocks,
   B is a conjugated diene block,
   n is an integer from 2 to 6,
   X is the residue of a coupling agent, and
   the A1 block has a peak molecular weight that is at least 2.5 times the peak molecular weight of the A2 block.

3. The adhesive composition of claim 1, wherein the HAT copolymer has the formula $(A2-B-A1)_nX$, wherein X is the residue of a coupling agent, and wherein the copolymer is bound to the coupling agent at the A2 block.

4. The adhesive composition of claim 1, wherein the HAT copolymer is blended with at least a second polymer which is different than the HAT copolymer, forming a blended HAT copolymer.

5. The adhesive composition of claim 1, wherein the HAT copolymer is characterized as having a tensile strength of from 0.1 MPa to 10 MPa as determined in accordance with ASTM D412 or ASTM D638.

6. The adhesive composition of claim 1, wherein the HAT copolymer is characterized as having a melt index ranging from 5 g/10 min to 200 g/10 min. as determined in accordance with ASTM D1238 measured at 200° C. with a 5 kg mass.

7. The adhesive composition of claim 1, wherein the conjugated diene is hydrogenated for a hydrogenated highly asymmetric triblock copolymer.

8. The adhesive composition of claim 1, wherein the second block is a mixed midblock with amounts of two dienes in a ratio ranging from 10:90 to 90:10.

9. The adhesive composition of claim 1, wherein the second block is a mixed midblock with mixtures of isoprene and butadiene or butadiene and myrcene.

10. The adhesive composition of claim 1, wherein the conjugated diene block is formed from a butadiene monomer or an isoprene monomer that is a substantially pure monomer.

11. The adhesive composition of claim 1, wherein the second block is a mixed midblock comprising butadiene and isoprene, and wherein the butadiene is present in an amount of at least 20% wt. the total weight of the entire second block.

12. The adhesive composition of claim 1, wherein the conjugated diene block is formed from a butadiene monomer, and wherein the conjugated diene block has a vinyl content ranging from 8 mol % to 95 mol %.

13. The adhesive composition of claim 1, wherein the conjugated diene block is formed from a butadiene monomer or an isoprene monomer containing up to 10% by weight, of structurally related conjugated dienes selected from 2,3-dimethyl-1,3-butadiene, 1,3-pentadiene and 1,3-hexadiene and 7-methyl-3-methylene-1,6-octadiene.

14. The adhesive composition of claim 1, wherein the polymer of a conjugated diene is formed from a butadiene monomer, and wherein the conjugated diene block has a vinyl content that progressively increases across the block.

15. The adhesive composition of claim 1, wherein the HAT copolymer is in pellet form.

16. A label or a surface protection film formed by laminating or applying an adhesive layer comprising the adhesive composition of claim 1.

17. The adhesive composition of claim 1, wherein the tackifying resin is selected from the group consisting of C5 hydrocarbon resins, C5/C9 hydrocarbon resins, hydrogenated and partially hydrogenated C9 hydrocarbon resins, rosin esters, terpenes and styrenated terpene resins.

* * * * *